United States Patent [19]
Sugita

[11] Patent Number: 5,699,380
[45] Date of Patent: Dec. 16, 1997

[54] SPREAD SPECTRUM COMMUNICATION TERMINAL APPARATUS IN CDMA CELLULAR TELEPHONE SYSTEM

[75] Inventor: Takehiro Sugita, Kanagawa, Japan

[73] Assignee: Sony Corporation, Tokyo, Japan

[21] Appl. No.: 533,761

[22] Filed: Sep. 26, 1995

[30] Foreign Application Priority Data

Sep. 30, 1994 [JP] Japan ................. P06-262035

[51] Int. Cl.⁶ ................ H04K 1/00; H04L 1/02
[52] U.S. Cl. ............ 375/208; 375/347; 375/355; 455/137
[58] Field of Search ................. 375/205, 206, 375/208, 347, 267, 355, 364, 367, 371, 343; 455/137, 139, 53.1, 56.1; 370/203, 184

[56] References Cited

U.S. PATENT DOCUMENTS

| | | | |
|---|---|---|---|
| 3,964,065 | 6/1976 | Roberts | 375/347 |
| 5,265,119 | 11/1993 | Gilhousen et al. | 375/205 |
| 5,285,482 | 2/1994 | Sehier et al. | 375/347 |
| 5,361,276 | 11/1994 | Subramanian | 375/200 |
| 5,383,220 | 1/1995 | Murai | 375/200 |
| 5,388,126 | 2/1995 | Rypinski et al. | 375/364 |
| 5,488,638 | 1/1996 | Kazecki et al. | 375/347 |
| 5,511,067 | 4/1996 | Miller | 370/184 |
| 5,546,429 | 8/1996 | Chiasson et al. | 375/347 |
| 5,550,872 | 8/1996 | Liberti, Jr. et al. | 375/347 |
| 5,577,022 | 11/1996 | Padovani et al. | 375/208 |

Primary Examiner—Tesfaldet Bocure
Attorney, Agent, or Firm—Jay H. Maioli

[57] ABSTRACT

A number of demodulators receive a signal transmitted from a certain base station and propagated via different respective propagation paths. Each demodulator generates a demodulated signal by examining the correlation between the received signal and a pseudo-noise (PN) spread code. A system time managing counter has a count value that is initialized at the timing of the forefront of the spread code in the modulator when at least one of the demodulators starts the demodulating process after power-on or after a reset operation. A signal combiner combines the demodulated signals that are adjusted to coincide in timing with each other from the demodulators at a timing determined by a system time managing counter after initialization and provides a combined demodulated signal. A control circuit reads the information of the time offset of the PN code to the system time from the sync channel message on a sync channel in the synthetic demodulated signal, so that the system time of the base station is set to the system time managing counter.

6 Claims, 8 Drawing Sheets

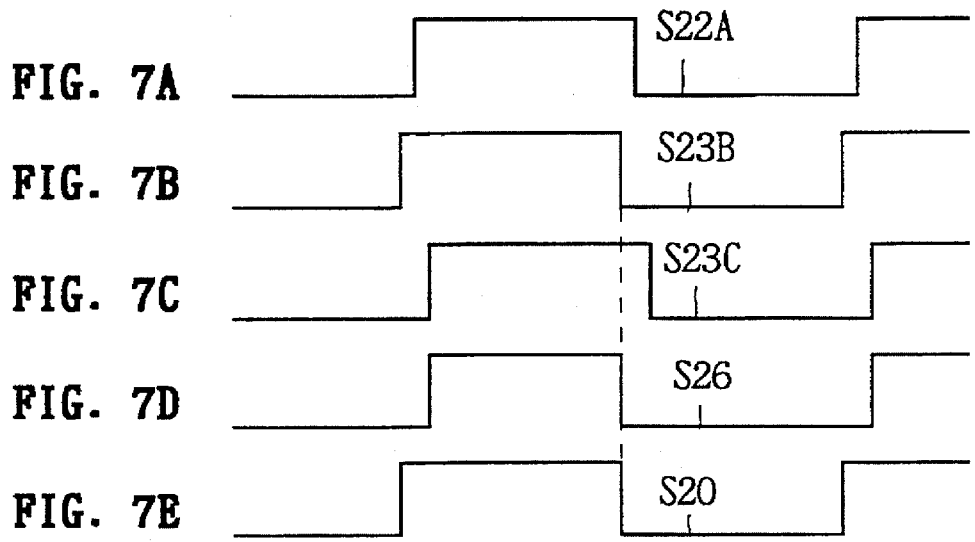
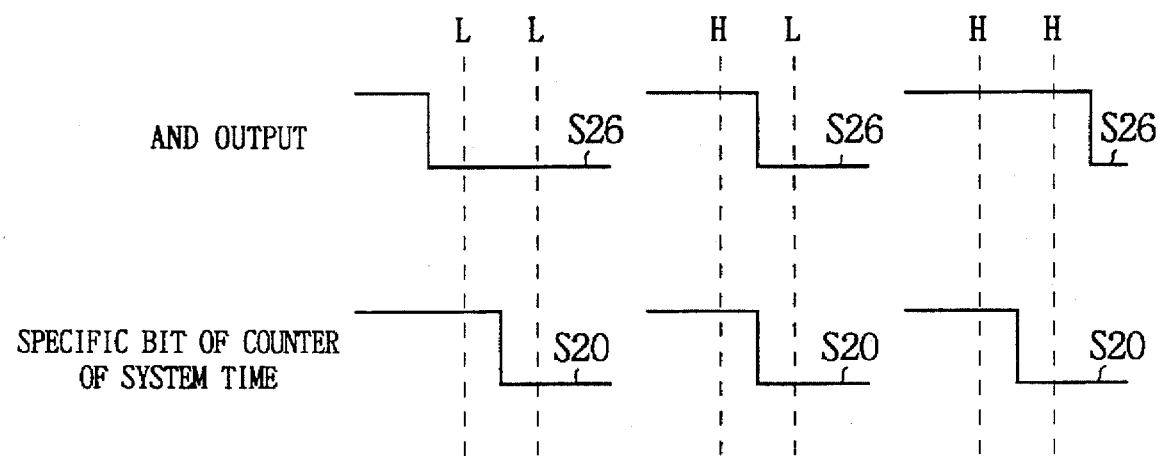

SPREAD SPECTRUM COMMUNICATION TERMINAL APPARATUS IN CDMA CELLULAR TELEPHONE SYSTEM

BACKGROUND OF THE INVENTION

1. Field of the Invention

This invention relates to a spread spectrum communication receiver, more particularly, to a spread spectrum communication terminal apparatus in which a mobile terminal apparatus of CDMA (Code Division Multiple Access) cellular system is built within.

2. Description of the Related Art

The CDMA digital cellular system differs from the other cellular systems on the point that the same frequency is used by all base stations of the system containing the neighboring cells (service areas). In this CDMA digital cellular system, it has been prescribed that the forward link channel, that is, the channel from the base station to the mobile station should be composed of four code channels: a pilot channel, a sync channel, a paging channel, and a traffic channel.

The pilot channel is the channel for repeatedly transmitting the Pseudo Noise code (hereinafter, referred to as the PN code), and is used for synchronism acquisition, maintenance, and clock reproduction in the mobile station. The communication data is not transmitted on this prior channel.

The sync channel is used for obtaining the time information and adjusting the timing of the long period PN code between the base station and the mobile station. The paging channel is used for transmission of the traffic channel allocating information as well as the information needed for hand-off and the terminal call information of the time at receiving. The traffic channel is used for transmission of the voice information a the time of speaking.

In FIG. 1, the transmitting unit of the base station side of the CDMA digital cellular system is shown. The transmitting unit 1 generates four code channel products by multiplying data of the four code channels by the spread codes respectively, and transmits the channel products with the same frequency after multiplexing them. In this system, the code which is produced by multiplying the PN code by the Walsh code is used as the spread code, and such method in which the spread code is changed by changing the Walsh code, for each channel, into "0", "32", "1", and "n" is adopted, wherein the code length of the Walsh code is 64.

The transmitting unit 1 sends as a pilot channel the product of the multiplication of the PN code and the Walsh code which is always zero, that is, the result of and exclusive-OR operation. Therefore, it means that the PN code is transmitted just as it is on the pilot channel. Accordingly, detection of the PN code by the mobile station means examining the timing of the spread code which is transmitted using the prior channel. The mobile station can demodulate the data of the desired code channel by selecting the spread code.

The mobile terminal of the conventional cellular telephone system has only one demodulator. Even if two demodulators are provided those are simply equipped for space diversity, therefore they operate at the same timing. On the other hand, in the CDMA digital cellular system, the mobile terminal has adopted such a scheme that multiple reflected waves from the base station are received and synthesized into a combined signal. The multiple reflected waves, which are referred as "multi-path", reach the mobile station with propagation delays corresponding to differences between the propagation distances resulting from being reflected by reflective objects such as buildings.

In the CDMA digital cellular system, such a scheme is adopted that the quality of communication is improved by demodulating the signals which are corresponding to respective paths by means of the plural demodulators, utilizing such features of spread spectrum communication that even if there are a plurality of multi-path signals they can be individually separated and demodulated, and then combining them. However, the propagation time of each reflected wave continuously varies in response to movement of the mobile terminal, thereby the difference of the processing time among respective demodulators also varies. Consequently, each demodulator has to operate on the basis of an independent timer (counter). Further, the mobile terminal has a signal combiner, etc. operating on the timing being different from the timings of these plural demodulators, accordingly the function for totally managing these plural timings is difficult to be realized and still have the receiving function meeting the specification.

SUMMARY OF THE INVENTION

It is an object of this invention to provide a communication terminal apparatus having the function for totally managing the timings of the respective demodulators even if there are any changes in the processing timings of the respective demodulators due to the changes of the magnitude of the propagation delay of the respective paths consisting of the multi-path.

In the spread spectrum communication receiver according to this invention, plural demodulators (12A), (12B) and (12C) are provided with the received signal (S1) which is transmitted from the same base station and propagated via the different propagation paths. A signal combiner combines the demodulated signals (S3A), (S3B), and (S3C) which have been demodulated by taking the correlation of the received signal (S1) and the PN code at each demodulator, and outputs it as the combined demodulated signal (S4). A system time managing counter has such a function that when at least one of the plural demodulators starts the demodulating operation after power-on or after resetting, the count value is initialized at the timing of the forefront of the PN code in the demodulator.

Further, in this invention, the system time managing counter (15) advances the count value of the system time managing counter (15) by the time offset of the PN code which is obtained from the received signal (S1), and then restarts the counting operation at the forefront of the specific digit number, hereby the count value of the higher order digit than the number is set.

Further, in this invention, such a function is provided in the system time managing counter (15) that the timing of the specific bit of the counter and the timing of the specific bit of each of the counters which are included in the demodulators (12A), (12B), and (12C) are compared, and the timing of the specific bit is caused to coincide with the earliest one of the demodulators which are now demodulating, so that the count value is sometimes advanced and sometimes delayed.

When at least one of the plural demodulators (12A), (12B), and (12C) has started the demodulating operation after power-on or after resetting, the count value of the system time managing counter (15) is initialized at the timing of the forefront of the PN code in the demodulator (12A), (12B) and (12C). As a result, it is able to cause the signal combiner (13) to operate correctly at the time of receiving a sync channel, and also able to control it to be such a status that the data of the sync channel can be received.

Further, when the count value of the higher order digit is set in the system time managing counter (15), the time offset of the PN code which is sent by the base station is corrected first, and then the count value of the higher order digit is set at the forefront of the stated digit number. Thereby, the bit number of the compactor (19) which gives the set timing can be diminished, and the problems which are concerned in the operating speed of the apparatus can be alleviated.

Furthermore, the specific bits of the counters which are provided independently in respective demodulators (12A), (12B), and (12C) and the timing of the specific bit of the system time managing counter (15) are compared, and the timing of the specific bit is caused to coincide with the earliest one of the demodulators which are now demodulating. Thereby, the count value of the system time managing counter can be adjusted to follow the change of the propagation delay property.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 7A to 7E are timing charts explaining the method for adjusting the system time during demodulating;

FIGS. 8A to 8C are timing charts explaining the time relation between the counter which is included in the demodulator and the system time managing counter.

DETAILED DESCRIPTION OF THE EMBODIMENT

Preferred embodiments of this invention will be described with reference to the accompanying drawings:

(1) General Configuration of the Demodulating Unit

Figure 1:
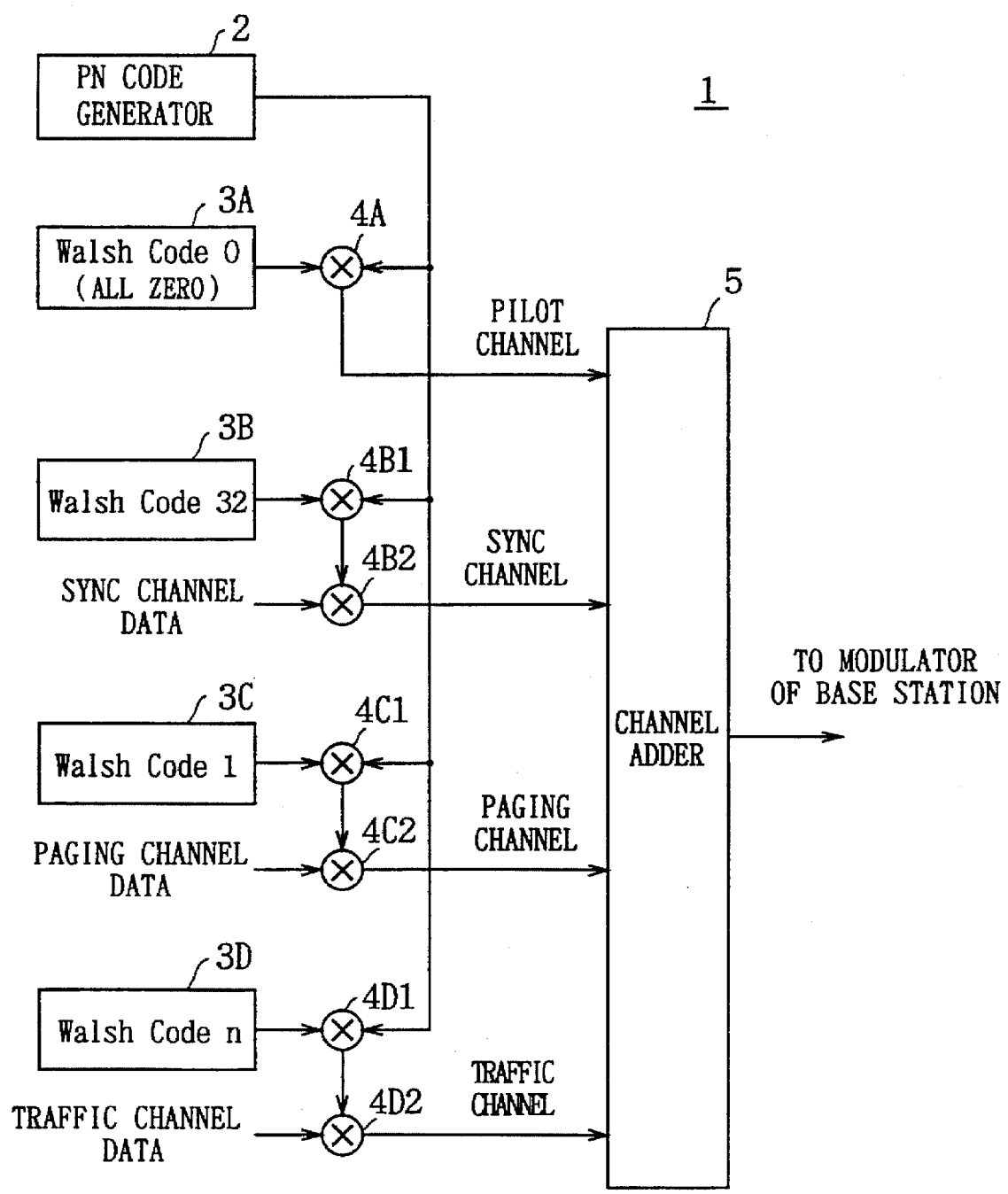
FIG. 1 is a block diagram showing the channel configuration of the forward link (direction from a base station to a mobile terminal) of CDMA cellular.
Figure 2:
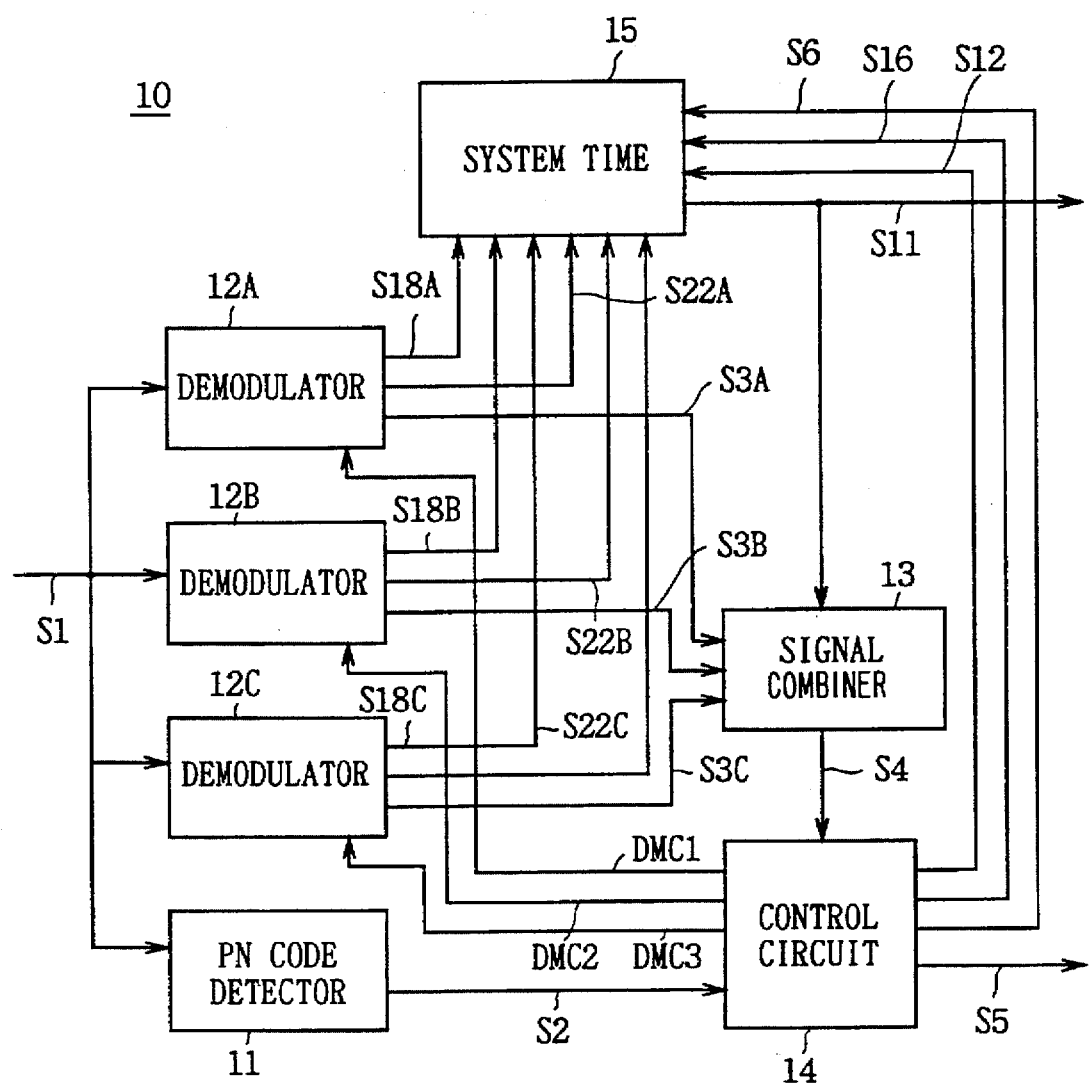
FIG. 2 is a block diagram showing an embodiment of the demodulating unit which is utilized in the spread spectrum communication terminal apparatus according to this invention.

FIG. 2 generally shows a demodulating unit 10 of a mobile communication terminal apparatus according to the present invention. The mobile communication terminal apparatus obtains a received signal S1 by receiving a transmitting signal from each base station. The received signal S1 includes four components, a pilot channel, a sync channel, a paging channel, and a traffic channel as stated above, and the signal S1 is applied to a PN code detector, and demodulators 12A, 12B, 12C of the demodulating unit 10. The PN code detector 11 detects the timing of the PN code included in the pilot channel, and outputs a timing detection signal S2. This timing detection signal S2 is applied to a control circuit 14. The control circuit 14 generates demodulator control signals DMC1, DMC2, and DMC3 based on the timing detection signal S2 and applies these control signals to demodulators 12A, 12B, and 12C respectively. Here the control circuit 14 is composed of a CPU, and controls each circuit of the mobile communication terminal apparatus as well as various signal processes. The demodulators 12A to 12C are initialized by the demodulator control signals DMC1 to DMC3 respectively, that is, a PN code generator in each demodulator is adjusted in timing to the PN code of demodulation data of the path which will be demodulated by the demodulator, so that the operation of the demodulators 12A to 12C starts. After this demodulate operation has started, the demodulators 12A, 12B, and 12C respectively continue the demodulation operation while following the advance or delay of the data included in the received signal S1.

The demodulators 12A to 12C and the PN code detector 11 each includes a counter (not shown) for generating a timing signal needed for the operation.

The demodulators 12A to 12C generate demodulated data S3A, S3B, and S3C respectively based on the received signal S1. The demodulated data generated at the demodulators 12A to 12C are adjusted in timing to coincide with each other at output buffers and applied to a signal combiner 13. The signal combiner 13 combines the applied demodulated data by adding together these data to generate demodulated data S4. This demodulated data S4 is applied to the control circuit 14, and then outputted as receiving data S5 to be processed.

The demodulator 10 has a system time managing counter 15 for managing the reference timing of the entire mobile terminal. The system time managing counter 15 applies the reference timing signal to the signal combiner 13 and a transmitter (not shown).

(2) Establishment of the System Time by the Demodulating Unit

(2-1) Initial Operation

The mobile communication terminal apparatus has to establish the reference timing which is synchronized with the system time being the reference time which is maintained by the base station. Therefore, the mobile communication terminal apparatus receives the sync channel after power-on or after resetting. By receiving the message in the sync channel, and knowing the set timing and the set value which are contained in it, the reference timing is established.

The count value of the system time managing counter 15 is reset in the initial timing of the PN signal generated by the demodulator which demodulated the sync channel, and on the basis of that timing a suitable timing for receiving the message of the sync channel is given to the signal combiner synthesizer 13.

The reason why the initial timing of the PN code is used is that the forefront of the frame of the sync channel coincides with the forefront of the PN code. In this manner, the data of the sync channel which have been demodulated in respective demodulators 12A to 12C are combined in the signal combiner 13, and then applied to the control circuit 14. The sync channel message is interpreted by the control circuit 14.

(2-2) Initialization of the System Time (Summary)

Next, a procedure for setting the system time in the system time managing counter 15 is explained with reference to FIGS. 3A and 3B. At first, the control circuit 14 takes out the information of the time offset of the PN code, the super-frame number and its setting timing from the sync channel message. The system time of each base station is in common, however, the PN code sent by each base station is transmitted with the predetermined time offset with respect to the system time so that the mobile communication terminal is able to identify each base station. On the other hand, the data of the paging channel and the traffic channel of all base stations are sent with the timing of the system time, so there is not a time offset to the system time. The purpose of this is that the timing of the receiving data is not changed even though the base station which is received is switched, or handed off.

First, the control circuit 14 takes out the information of the time offset of the PN code, the super-frame number and its setting timing from the sync channel message.

To receive these channels, it is required to know the magnitude of the time offset of the PN code. When the sync channel is received, the magnitude of the offset is not known, so the forefront of the frame of the sync channel is sent in such a manner that it is offset by the same magnitude as the PN code. The forefront of the super-frame of the system time coincides with the forefront of the PN code without a time offset, therefore, at the time that the message of the sync channel has been received, the operation of the system time managing counter 15 has a similar time offset, usually.

Figure 3:
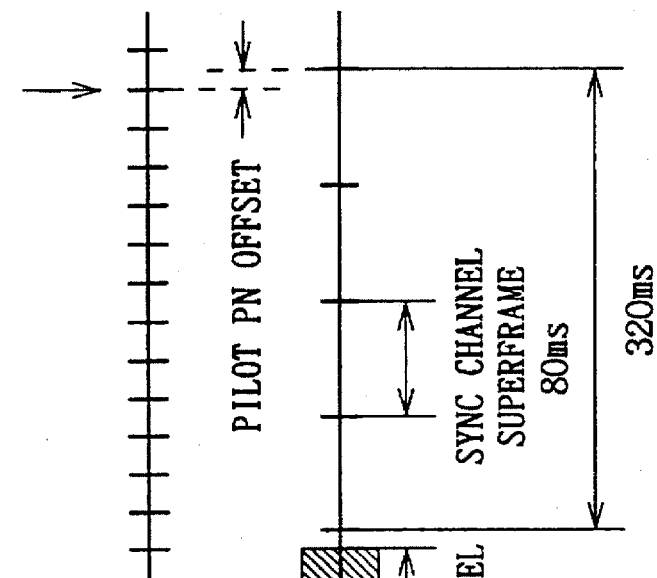
FIGS. 3A and 3B are timing charts used for the description of the relation between the system time and the super-frame.

One division in FIG. 3A Shows one period of the PN code (prior PN code) of the system time, 26.667 ms. Three of these form a super-frame. On the other hand, one division in FIG. 3B shows one period of the sync channel super-frame, which corresponds to three divisions in FIG. 3A, 80 ms, and is shifted by the time offset of the PN code. This figure shows the aspects of receiving of the sync channel message and setting of the system time in the mobile communication terminal.

The base station sends the pilot PN code, which is the spread code, in such a manner that it is caused to delay by the time offset of the PN code (the pilot PN offset). Sending of the sync channel message is started at the forefront of the super-frame. According to the specification of the CDMA cellular, it has been stated that the system time is set after the time of, for instance, (the period of four super-frames)−(pilot PN offset) has past from the end of the super-frame by which the last of the sync channel message has been sent.

(2-3) Initialization of the System Time (Embodiment)

Figure 4:
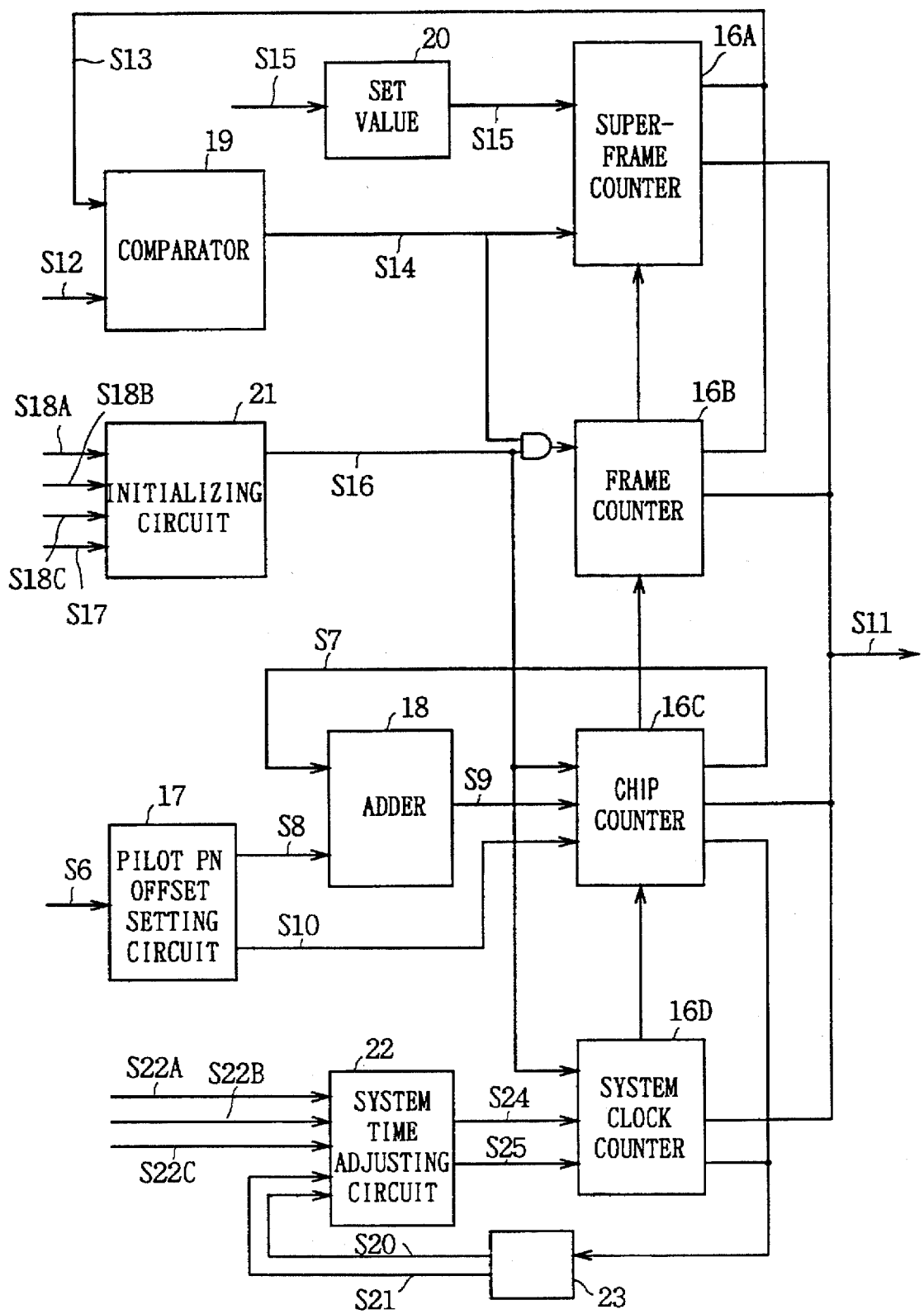
FIG. 4 is a block diagram showing the configuration of the system time managing counter.

An example of the circuit for realizing such operation is shown in FIG. 4. In this figure, the system time managing counter 15 is composed of a super-frame counter 16A, a frame counter 16B, a chip counter 16C, and a system dock counter 16D.

The pilot PN offset adjust indication signal S6 is applied to a pilot PN offset setting circuit 17, and the pilot PN offset setting circuit 17 outputs a pilot PN offset value S8 and a load signal S10. The adder 18 adds the output count value S7 of the chip counter 16C with the pilot PN offset value S8, and then outputs the result of the addition as the varied value S9. The varied value S9 is loaded to the chip counter 16C in response to the load signal S10. Owing to this operation, the system time value S11 can be advanced by an amount of the pilot PN offset time.

The comparator 19 compares the super-frame setting indication S12 with the count value S13, and then outputs the super-frame setting signal S14 being the active pulse when the timing which satisfies the above condition has become. At this timing, the set value S15 which has been written in the set value circuit 20 is loaded into the super-frame counter 16A. At this time, the frame counters 16B, 16C, and 16D are cleared by the clear signal S16 which is given from the initializing circuit 21. In this manner, at the forefront of the fifth super-frame from the super-frame including the last of the sync channel message, the super-frame number is set to the super-frame counter 16A. The clear signal S16 is generated by the initialization indicate signal S17 and the demodulator initial timing signals S18A, S18B, and S18C.

Figure 5:
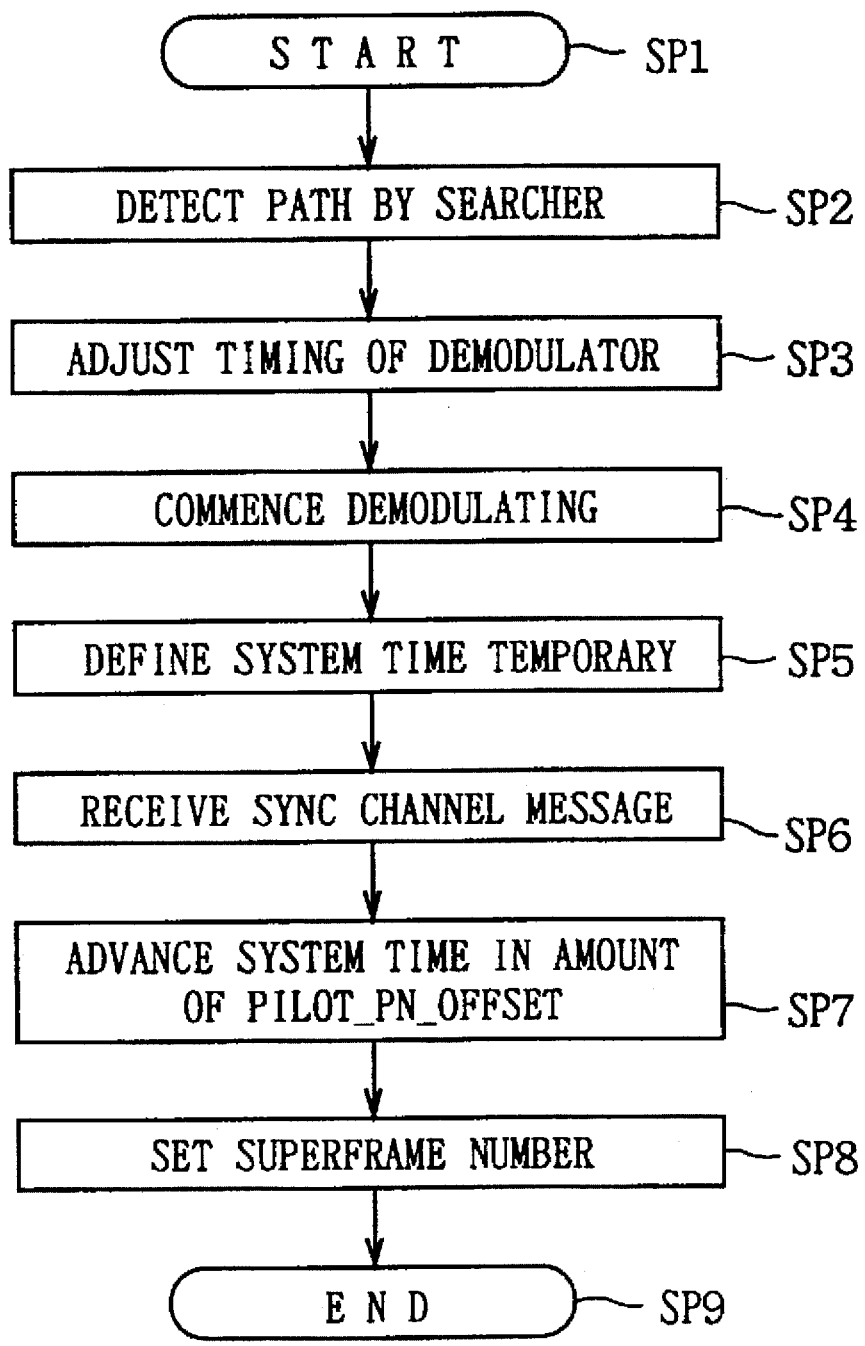
FIG. 5 is a flow chart showing the procedure for setting the super-frame.

By the above processing, the system time is set in the system time managing counter 15, and such a state becomes that the paging channel and the traffic channel can be received. Correctly speaking, the system time is maintained in the mobile communication terminal in such a manner that it is delayed by the amount of the signal propagation delay with respect to the base station, and has been thus stated in the specification of CDMA cellular system. To decide whether it is the setting timing or not, the comparator 19 is used. If the counter for the system time has been put forward to the amount of the pilot PN offset (step SP7 in FIG. 5, provided that all of the digits of which orders are lower than the frame number are zero, it is needed to merely examine that any of the digits of which orders are frame number and over coincides with the setting frame by comparison (step SP8 of FIG. 5), hence the bit number of the comparator can be diminished. This means that a logic circuit which has a lower operating speed can be used to compose the comparator 19, and the possibility of realization of the simplified become higher.

Further, in the above, the super-frame number is set to the super-frame counter after advancing the count value of the chip counter. However, the time offset may be loaded to the chip counter 16C when the count value of the chip counter just after setting the super-frame number to the super-frame counter is zero.

(2-4) Adjustment of the System Time

When the foregoing the initialization of the system time has finished, however, the system time which is managed by the mobile station is different from that of the base station, and it is now advanced or delayed temporally. This is due to the fact that when the terminal has moved the propagation distance between the base station and the mobile terminal changes, and hence the receive timing changes. Particularly in the case of being in the midst of talking, that is, in the case where transmitting-receiving with traffic channel is being done, when the timing of transmitting-receiving has varied for the reason that the mobile communication terminal has gone away or come near to the base station, it is needed to change the timing of the signal combiner 13 and the transmitter, proportionally.

Figure 6:
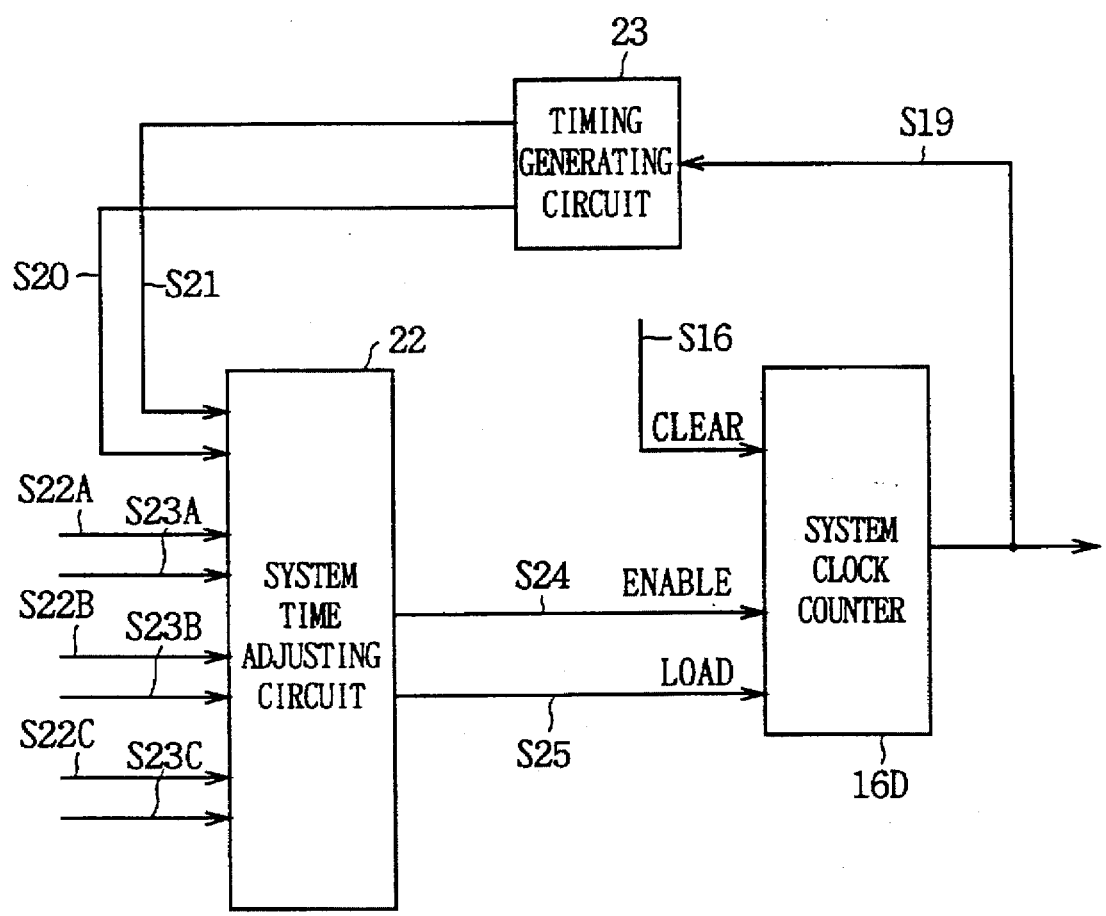
FIG. 6 is a block diagram explaining the system time adjusting circuit and its peripheral circuit.

In that case, it is not allowed to sharply change the reference timing, so as to prevent making it impossible to demodulate the data at the base station. In this invention, the circuit shown in FIG. 6 causes the counter of the system time managing counter 15 of FIG. 2 to follow the change of the receive timing at the speed which has been stated in the specification of CDMA cellular system. This circuit is composed of the system time adjusting circuit 22, the system clock counter 16D, and the timing generating circuit 23.

The timing generating circuit 23 generates the check timing S20 and the adjust timing S21 from the count value S19 of the system clock counter 16D. The specific bits S22A, S22B, and S22C, and the data validity signals S23A, S23B, and S23C which indicate validity/invalidity of the data are inputted to the system time adjusting circuit 22 from respective demodulators 12A, 12B, and 12C. But, the period of the check timing signal S20 have to be more than or equal to the period of the specific bits S22A to S22C of the counter of each demodulator. If the period is too large the frequency of adjustment becomes small, hence it is to be adequately determined.

The period of the specific bit of each demodulator 12A to 12C may be set to a sufficiently large value, so as not to mistake it for a period due to a time difference of respective paths of the multi-path. In FIG. 7E, the specific bits of each demodulator 12A to 12C and the system time managing counter 15 are explained using the same grades. From the system time adjusting circuit 22, the delay directing signal S24 and the advance directing signal S25 are applied to the system time managing counter 15.

Usually, the system time managing counter 15 is incremented at a constant speed. In this example, the operation for causing the counter 15 to be delayed is realized by stopping the counter temporarily. That is, at the time when it should be counted as with "0, 1, 2, 3, . . . ", it is counted as with "0, 1, 1, 2, 3, . . . " This can be realized by setting the delay directing signal S24 which is inputted to the enable input of the system clock counter 16D to disable.

On the other hand, to advance the system clock counter 16D, one number is skipped in counting. That is, at the time when it should be counted as with "0, 1, 2, 3, . . . ", it is counted as with "0, 1, 3, . . . " By activating the advance directing signal S25 which is connected to the load input of the system clock counter 16D, "3" can be loaded next to "1".

Next, the method for generating the delay directing signal S24 and the advance directing signal S25 is explained with reference to FIGS. 7A–7E. At first, a logical product of the specific bits of the counters of respective demodulators 12A to 12C is taken (A logical add may be taken. But, in this case, the check timing which will be next explained should become a leading edge rather than a trailing edge, and the state decided is thus changed). The trailing edge of the logical product signal coincides with the trailing edge of the counter having the most advanced timing out oft he three demodulators 12A to 12C.

The trailing edge of the logical product output is compared in timing to the trailing edge of the check timing signal S20. That aspect is illustrated in FIGS. 8A to 8C. On the both sides of the trailing edge of the check timing signal S20, the logical product output S26 is sampled. If its result is "L, L", then it is needed to advance the system time value S11, hence the advance directing signal S25 is activated.

If the result is "H, L" which means nearly the same timings, then it is needed to neither advance nor delay it, therefore the advance directing signal S25 and the delay directing signal S24 are not activated. In the case where the result is "H, H", it is needed to delay the system time, so the delay directing signal S24 is activated. Hereby, it can approach the timing of the most advanced demodulator which is demodulating the system time. The reason why the term "approach" has been used is that an amount of only one step of the counter can be adjusted per one time, that is, the timing cannot be caused to coincide with the other by changing of one time. In the specification of CDMA cellular, hasty changing of the transmitting timing is inhibited, hence, matching of the adjusting speed is realized by adequately selecting the period of the check timing signal S20 which is inputted to the system time adjusting circuit 22.

Figure 9:
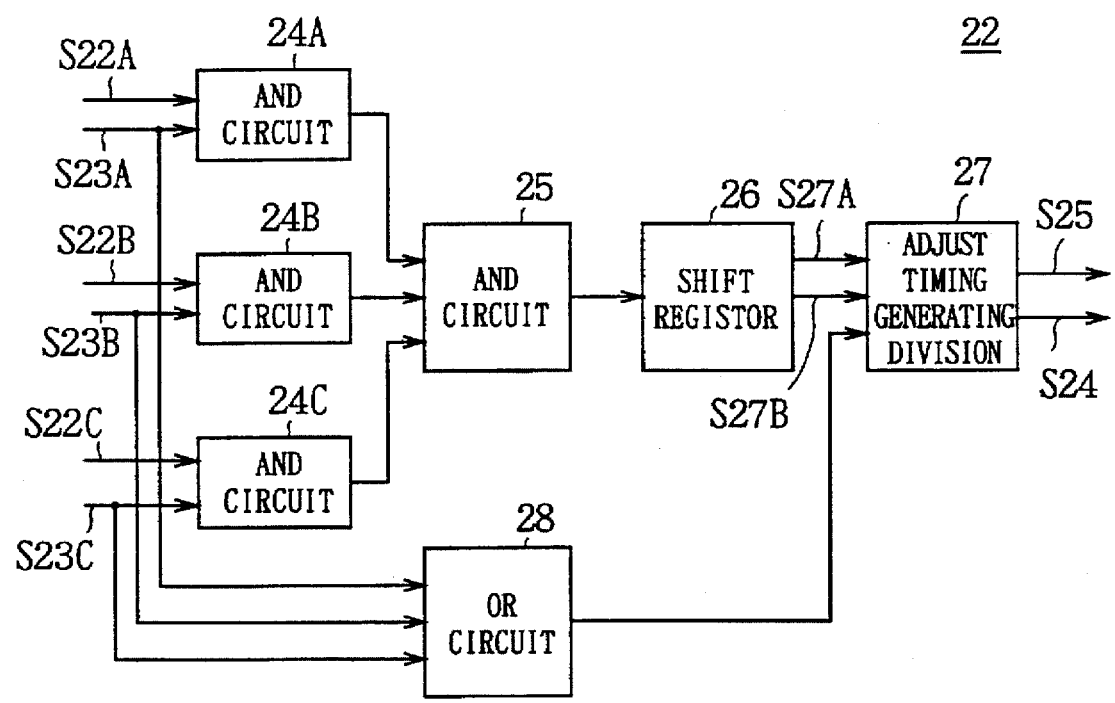
FIG. 9 is a block diagram showing the configuration of the system time adjusting circuit.

FIG. 9 shows an example of the system time adjusting circuit 22 for realizing these. Logical products of the specific bits 22A to 22C of the counters of respective demodulators 12A to 12C and the data validity signals S23A to S23C of the demodulators 12A to 12C are taken, with the respective AND circuits 24A, 24B, and 24C. This is performed in order to preclude the demodulators 12A to 12C which are not demodulating from the object of timing adjustment of the system time. The output of the AND circuit 25 is shown by the S26 of FIG. 7D. This signal S26 is inputted to the shift register 26, and the data which have been sampled at the timings of the broken lines shown in FIGS. 8A to 8C are outputted as the delayed outputs S27A and S27B.

The adjust timing generating unit 27 generates the advance directing signal S25 or the delay directing signal S26, in accordance with the same algorithm as the explanation of FIGS. 8A to 8C. In the OR circuit 28, logical add is taken with respect to the data validity signals S23A to S23C of all demodulators. At this time, in the case where the output S28 is "L", it means that all demodulators 12A to 12C are in the state of data invalidity, and in this case, the adjust timing generating unit 27 controls both of the advance directing signal S25 and the delay directing signal S24 to be not activated.

(2-5) Effects

As stated above, after the demodulators 12A to 12C have started demodulation, the system time managing counter 15 is initialized at the forefront of the PN code which has been detected on the demodulators 12A to 12C, as a result, it is able to cause the signal combiner 13 to operate correctly at the time of receiving the sync channel, and also able to control it to be such a state that the sync channel message can be certainly received.

Besides, when the super-frame number is set in the system time managing counter 15, the time offset of the PN code which is sent by the base station is corrected first, and then the super-frame number is set at the forefront of the frame of the stated sync channel, as a result, the bit number of the comparator 19 which gives the set timing can be diminished, and the problems which are concerned in the operating speed of the apparatus can be alleviated.

Further, the specific bits S22A to S22C of the counters which are included independently in respective demodulators 12A to 12C for generating the timings of them and the timings S20 and S21 of the specific bit of the system clock counter 16D are compared, and the system clock counter 16D can be advanced or delayed, as a result, even though the propagation delay time of each path of multi-path changes the timing of the signal synthesizer 13 or the transmitting system can be adjusted in accordance with the specification of CDMA cellular. Hereby, the stabilized transmitting/receiving can be realized.

(3) Other Embodiments

In the above embodiment the demodulating unit of the digital cellular mobile terminal of CDMA system has been described. However, this invention is not only limited to such a case but is possible to be widely applied to the communication terminal apparatus which has similarly adopted CDMA system.

As stated above, according to this invention, a communication terminal apparatus can be obtained, in which the system time of the apparatus can be controlled to be such a state that the signal combiner can correctly operate at a time of receiving the control channel after power-on or after resetting.

Further, as stated above, according to this invention, a communication terminal apparatus can be obtained, wherein the apparatus includes the system time managing counter of which operating speed at the time of setting of the upper digit of the system time is fast.

As stated above, according to this invention, the timing of the specific bit of the system time managing counter is caused to coincide with the fastest one out of the demodulators which are demodulating, as a result, a communication terminal apparatus including the system time managing counter which is able to adjust the count value following to the change of the propagation delay property can be obtained.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A spread spectrum communication terminal apparatus comprising:

plural demodulators for receiving a signal received via different propagation paths after being transmitted from a base station and for generating demodulated signals by examining a correlation of said received signal and a pseudo noise code;

a system time managing counter having a count value to be initialized at a timing of a forefront of the pseudo noise code in said demodulator when at least one of the said plural demodulators has started a respective demodulating operation;

a signal combiner for combining demodulated signals from said plural demodulators at a timing given from said initialized system time managing counter to generate a combined demodulated signal; and control means for receiving the combined demodulated signal from said signal combiner for extracting timing information from said combined demodulated signal, and for setting a system time of said base station to said system time managing counter on the basis of said timing information.

2. The spread spectrum communication terminal apparatus according to claim 1, wherein said control means extracts said timing information with respect to the time offset of said pseudo noise code for the system time of said base station from the sync channel in said combined demodulated signal.

3. The spread spectrum communication terminal apparatus according to claim 1, wherein said system time managing counter has means for setting the system time offset by a predetermined time for the timing of the forefront of said pseudo noise code.

4. A spread spectrum communication terminal apparatus comprising:

plural demodulators for receiving a signal which is received via different propagation paths after it has been transmitted from a base station and for generating demodulated signals by examining a correlation of said received signal and a pseudo noise code;

a signal combiner for combining demodulated signals to generate an output of a combined demodulated signal;

control means for extracting a time offset, a super-frame number, and a set timing value of the super-frame number of the pseudo noise code from information included in the sync channel of said combined demodulated signal; and a system time managing counter utilizing the extracted time offset and having a super-frame counter for counting the super-frame, time offset means for shifting the count timing of said super-frame counter by a predetermined time offset, super-frame number setting means for making the count operation of said super-frame counter to be continued from the predetermined super-frame number when a count value of said super-frame counter become a count value determined based on the set timing value of said super-frame number.

5. The spread spectrum communication terminal apparatus according to claim 4, wherein said time offset means has a time setting means to which a predetermined time offset value is set and a second counter having a count value to be advanced in response to the time offset value provided from said time offset means, said super-frame counter counts carry signals from said second counter, said super-frame number setting means has a number setting device to which the super frame number is set and a comparator for comparing the count value of said super-frame counter with the set timing value of the super-frame number, and if the count value of said super-frame counter coincides with the set timing value of said super-frame number, said super-frame number in said number setting device is set to the super-frame counter.

6. A spread spectrum communication terminal apparatus comprising:

plural demodulators for receiving a signal received via different propagation paths after being transmitted from a base station and for generating demodulated signals by examining a correlation of said received signal and a pseudo noise code;

a signal combiner for combining demodulated signals to generate an output of a combined demodulated signal; and a system time managing counter to which the system time of said base station is set; wherein said system time managing counter has a system time adjusting circuit for advancing or delaying a count value by comparing a timing of a specific bit with a timing of a specific bit of each counter included in each said demodulator, and causing the timing of said specific bit to coincide with an earliest one of the demodulators that is demodulating.

* * * * *